United States Patent Office 3,352,827
Patented Nov. 14, 1967

3,352,827
PRODUCTION OF HYDROXY-CONTAINING COPOLYMERS BY SLURRY COPOLYMERIZATION OF DICARBOXYLIC ACIDS IN THE PRESENCE OF A MONOEPOXIDE
Kazys Sekmakas, Chicago, Ill., assignor to De Soto, Inc., a corporation of Delaware
No Drawing. Filed Apr. 6, 1964, Ser. No. 357,744
13 Claims. (Cl. 260—72)

The present invention relates to non-gelled, solvent-soluble hydroxy copolymers and the production thereof. More particularly, the invention is directed to the copolymerization of dicarboxylic monoethylenically unsaturated acids, especially fumaric acid and itaconic acid, in organic solvent solution medium in which such acids are poorly soluble.

Dicarboxylic monoethylenically unsaturated acids, and especially fumaric acid and itaconic acid, cannot normally be incorporated in significant proportion in solution copolymers. This is because most vinyl monomers are extensively soluble in the common polymerization solvents and copolymerize rapidly therein, whereas the diacids under consideration are of such limited solubility that any significant proportion thereof which may be present exists in suspension, unavailable for copolymerization. As a result, the copolymer product is largely devoid of the diacids, only a few percent up to a maximum of about 10% by weight being present despite the use of far larger proportions of the diacid monomer.

When the diacid anhydride exists, e.g., maleic anhydride, the anhydride possesses far greater solubility in organic solvents and it may be copolymerized. However, the production of acceptable hydroxy derivatives of anhydride copolymers is far from simple. Even when a successful procedure is evolved, as described in my copending application S.N. 229,743, filed Oct. 10, 1962, now United States Patent No. 3,250,734, granted May 10, 1966, the copolymer product contains only a single hydroxyl group per anhydride group in the copolymer.

Of course, one can also ignore solution copolymerization, but the copolymer products produced by polymerization in bulk or in aqueous emulsion are generally of excessive molecular weight and hence of reduced solvent solubility and reactivity, and not comparable to those produced in solution.

Still other alternatives are available to one seeking hydroxy-containing copolymers. Thus, one may use monocarboxylic acids, e.g. acrylic acid or methacrylic acid, in the form of hydroxy esters such as hydroxy ethyl methacrylate, but this is quite costly and provides a lower cross-link density than is achieved by the invention. One may also use vinyl esters and hydrolyze or saponify copolymer to generate vinyl alcohol groups, but this is also expensive and the products possess only limited compatibility with other film-forming resins, especially acrylic copolymers.

Accordingly, the present invention is directed to a problem which has long perplexed the art.

In accordance with the present invention, the solvent solution copolymerization reaction is carried out in the presence of dispersed monoethylenically unsaturated dicarboxylic acid which is solubilized as polymerization proceeds by reaction with a monoepoxide under conditions favoring esterification, e.g. elevated temperatures of at least about 200° F. and the presence of an esterification catalyst.

The unsaturated dicarboxylic acid component is incorporated in the copolymer in an amount of from 2–50% preferably in an amount of from 5–30%, based on the weight of the copolymer.

As previously indicated, any dicarboxylic monoethylenically unsaturated acid may be used since these, as a class, are very poorly soluble, fumaric acid and itaconic acid being particularly poorly soluble. The selection of the particular acid which is to be employed will be, in part, governed by the economies of the situation and, to a considerable extent, one would select the particular insoluble acid which is least costly at the moment.

The particular monoepoxide which is selected is of secondary significance and any monoepoxide having a single oxirane group

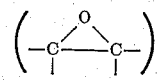

as the sole functional group thereof may be used.

Suitable monoepoxides are illustrated by ethylene oxide, propylene oxide, butene-2-oxide, phenyl glycidyl ether, isopropyl glycidyl ether, styrene oxide, etc. With the exception of ethylene oxide, the literature indicates that the preponderance of the hydroxyl group formed by the reaction are secondary hydroxyl groups.

It is preferred to tie up by reaction with monoepoxide all carboxylic acid groups which are available in the interpolymer, but this is not essential. Thus, at least 30% preferably at least 90 of the available carboxylic groups are converted to hydroxy ester groups.

While the interpolymers of the invention are useful alone in organic solvent solution coating compositions, they are preferably utilized in conjunction with another film-forming resin having functional groups such as carboxyl groups, oxirane groups, methyl groups or amine groups which are reactive with the hydroxy group which is formed in the interpolymers under consideration.

It is especially preferred to cure the hydroxy interpolymers of the invention with aminoplast resins or polyepoxide resins, or by a combination of both.

Particularly advantageous results are obtained when the hydroxy-containing interpolymers of the invention are blended with aminoplast resin and polyepoxide resin. Appropriate proportions are 40–90 parts by weight of hydroxy-containing interpolymer to 5–40 parts of aminoplast resin to 5–50 parts of polyepoxide resin.

The present invention is especially directed to coating compositions which cure to provide glossy, very hard and mar-resistant coatings which, despite their hardness, are flexible and reasonably resistant to impact. For this purpose, the interpolymers of the invention which cure extensively and which possess good compatibility are used in combination with aminoplast resins, especially heat-hardening, solvent-soluble condensation products of a triazine with excess formaldehyde. As is well known, solvent solubility is usually provided by etherifying the aminoplast resin with a $C_3$–$C_8$ alcohol, preferably butanol.

Any resinous polyepoxide may be employed to cure the interpolymers of the invention or to modify the cure thereof with aminoplast resins. Preferably, the polyepoxide is a polyglycidyl ether of a polyhydric organic compound, preferably a dihydric phenol, and most preferably a bis-phenol such as diglycidyl ethers of 2,2′-bis-(p-hydroxyphenylpropane) having average molecular weights of from 360 to about 7,000. The polyepoxide enhances flexibility and adhesion to a metal base while only slightly detracting from the hardness of baked films, such hardness being in part due to the large proportion of styrene or similar monomer in the interpolymer and in part due to the high compatibility with aminoplast resins and the excellent cure provided by the interaction of the aminoplast resin with the interpolymer.

Any ethylenically unsaturated material copolymerizable with the unsaturated dicarboxylic acid may be used, especially styrene, vinyl toluene and other vinyl aromatic compounds such as alpha-methyl styrene, and other $C_1$–

C₄ alkyl styrenes such as isopropenyl toluene, the dialkyl styrenes such as dimethyl styrene, and the halo-styrenes such as monochloro styrene, and methyl methacrylate. Since the hydroxy copolymer will include the residue of the esterfying monoepoxide, providing internal plasticization, large proportions of these hardening monomers may be used. Desirably, the interpolymers also include from 20-45% by weight of acrylate esters and methacrylate esters having two or more carbon atoms in the esterfying alcohol. Preferred monomers of this latter type are ethyl acrylate, butyl acrylate, 2-ethyl hexyl acrylate and butyl methacrylate.

When the ethylenically unsaturated material is monomeric, it is desirably selected to be free of any functional group capable of reaction with the oxirane group. On the other hand, polymeric unsaturated compounds may contain acidic or basic functionality, but these are too sluggish to interfere. Thus, one may incorporate 5% or more of unsaturated polyester resin containing from 0.005 to 0.40 gram mol of ethylenically unsaturated component per 100 grams of polyester, especially polyesters in which the unsaturation in the polyester is substantially confined to side chains in the polyester structure as by the use of a monoethylenically unsaturated monofunctional component such as crotonic acid or allyl alcohol in an amount to provide from 0.03-0.3 gram mol of unsaturated component per 100 grams of polyester. The unsaturated polyester resin may contain residual carboxyl or hydroxyl functionality. Indeed, it may contain either functionality in moderate excess over the other.

The interpolymers of the invention are desirably produced by a single stage solution copolymerization in which the monomers (except the dicarboxylic acid and the monoepoxide) are dissolved in an organic solvent which is also a solvent for the interpolymer which is formed and copolymerization is effected in the presence of a free-radical generating polymerization catalyst, elevated temperatures being normally used to speed the reaction. The dicarboxylic acid is dispersed in the solvent, preferably in finely divided form. The powdered dicarboxylic acid is readily suspended by agitation with about 1 to 4 times its weight of a liquid or a mixture of liquids. The resulting suspension is sufficiently fluid to be readily suspended by agitation at the reaction temperature.

Preferably, the monomers are dissolved in the organic solvent which is introduced into the reaction vessel slowly and at a uniform rate (desirably by continuous addition) to permit more precise control of the reaction and to provide a more uniform interpolymer product. Also, continuous monomer addition enables temperature control during the reaction despite the highly exothermic reaction which normally occurs.

Chain terminating agents, such as mercaptans, may be used to exert their known effect of lowered average molecular weight.

Any free-radical generating polymerization catalyst may be used, the selection of catalyst being determined by the desired temperature of the polymerization reaction. The important point is that the agent liberate free radicals under the conditions of polymerization so that the addition polymerization is facilitated. The class of catalysts under consideration is too well known to require extensive discussion, the examples illustrating suitable materials.

The particular nature of the organic solvent used for the solution copolymerization or for the solvent solution application of the interpolymers or mixtures containing the same is not a critical aspect of the invention. Butanol or 2-butoxy ethanol preferably in admixture with xylol, is a preferred solvent system, but the invention is not limited to specific solvents since many others are available and useful, such as toluene, methyl ethyl ketone, methyl isobutyl ketone, acetone, butyl acetate, 2-ethoxy ethanol, etc. The preferred volatile organic solvents are ketones, alcohols or aromatic hydrocarbons. The volatility corresponding to a normal boiling range of about 220-300° F. is such as to preclude the need for maintaining excessive pressure during the reaction.

Usually it is desirable to maintain the temperature above the normal boiling point of the reaction mixture which is kept at a pressure of about 30-50 pounds per square inch gauge, thus keeping the reaction medium in the liquid phase. Pressure may be adjusted by means of carbon dioxide, nitrogen, or other inert gases.

An esterification catalyst is used, preferably tertiary amine, quaternary ammonium salt or alkali metal salt. The preferred catalysts are sodium benzoate, benzyl trimethyl ammonium chloride or tri-n-propyl amine. The amount of catalyst may vary from 0.5% by weight, based on the weight of the dicarboxylic acid. The esterification should be carried out at a temperature of 200-300° F.

As a feature of the invention, the hydroxy copolymers of the invention can be formed to include coreactive groups spaced along the interpolymer chain to provide self-curing properties.

These coreactive groups are particularly exemplified by alkylol amide groups such as methylol acrylamide or ethers thereof and epoxide groups exemplified by allyl glycidyl ether. Thus, self-curing hydroxy copolymers containing 2-7% of acrylamide have been prepared and these exhibit excellent thermosetting properties.

In order to produce acrylamide interpolymers as indicated above, in a single stage solution copolymerization, and particularly where the acrylamide is also to be reacted with an aldehyde such as formaldehyde, then the presence of an alkaline catalyst is essential in the preparation of this type interpolymer. The alkaline catalyst, especially tertiary amine or quaternary ammonium salt, serves as an esterification catalyst for the monoepoxide-acid reaction and also serves as a catalyst for the aldehyde-amide reaction.

The invention is illustrated in the examples which follow in which all parts are by weight unless otherwise specified:

EXAMPLE 1

A valuable non-gelled, solvent-soluble hydroxy interpolymer is produced as follows.

Charge composition:
| | |
|---|---|
| Fumaric acid | 130 |
| Butylene oxide | 180 |
| Ethyl acrylate | 454 |
| Vinyl toluene | 270 |
| Xylol | 700 |
| 2-ethoxy ethanol acetate | 330 |
| Benzyl trimethyl ammonium chloride (60% solution in water) | 10 |
| Di-tertiary-butyl peroxide | 6.6 |
| Benzoyl peroxide | 2.2 |

*Procedure of preparation*

The interpolymer is prepared by charging into a reactor equipped with a stirrer, a nitrogen inlet tube, a thermometer, and a reflux condenser, 330 parts of 2-ethoxy ethanol acetate, 320 parts of xylol and 10 parts of benzyl trimethyl ammonium chloride (60% solution in water). 130 parts of powdered fumaric acid are dispersed in this liquid and the contents of the reactor are heated to 250° F. When a temperature of 250° is reached, the 180 parts of butylene oxide are added to the reactor over a period of 10 minutes. In a separate container, premix the 454 parts of ethyl acrylate, 270 parts of vinyl toluene, the 6.6 parts of di-tertiary butyl peroxide and 2.2 parts of benzoyl peroxide. This monomer-catalyst blend is added to the reactor over a 2-hour period while maintaining the temperature at 250-260 ° F. This temperature is maintained for an additional 4 hours until monomer conversion is complete.

The final characteristics of the hydroxy interpolymer are as follows:

| | |
|---|---|
| Solids (percent) | 49.4 |
| Viscosity (Gardner) | Y |
| Color (Gardner-Holdt) | 3-4 |
| Acid value (non-volatile) | 1.5 |

EXAMPLE 2

The present example will illustrate the invention using different proportions and solvents.

Charge composition:

| | |
|---|---|
| Butylene oxide | 99 |
| Fumaric acid | 75 |
| Vinyl toluene | 225 |
| Ethyl acrylate | 200 |
| Xylol | 350 |
| 2-butoxy ethanol | 200 |
| Isopropyl alcohol | 80 |
| Benzyl trimethyl ammonium chloride (60% solution in water) | 5 |
| Di-tertiary butyl peroxide | 2.5 |
| Benzoyl peroxide | 2.5 |

*Procedure of preparation*

Charge into a reactor equipped with a stirrer, a nitrogen inlet tube, a thermometer, and a reflux condenser 100 parts of xylol, 75 parts of fumaric acid, 200 parts of 2-butoxy ethanol and 5 parts of benzyl trimethyl ammonium chloride (60% solution in water). In a separate container, premix 99 parts of butylene oxide, 225 parts of vinyl toluene, 200 parts of ethyl acrylate, 2.5 parts ditertiary butyl peroxide, and 2.5 parts benzoyl peroxide. This monomer-catalyst blend is added to the reactor over a 2½-hour period while maintaining the temperature at 265-275° F. Hold this temperature for an additional 2 hours and then add 150 parts of xylol and 80 parts of isopropyl alcohol to adjust viscosity.

The final characteristics of the interpolymer are as follows:

| | |
|---|---|
| Solids (percent) | 48.4 |
| Viscosity (Gardner) | X-Y |
| Color (Gardner-Holdt) | 2 |
| Acid value (non-volatile) | 5.1 |

EXAMPLE 3

This example shows the invention as applied to styrene oxide.

Charge composition:

| | |
|---|---|
| 2-butoxy ethanol | 330 |
| Xylol | 320 |
| Fumaric acid | 128 |
| Benzyl trimethyl ammonium chloride (60% solution in water) | 8.8 |
| Styrene oxide | 270 |
| Vinyl toluene | 270 |
| Ethyl acrylate | 454 |
| Di-tertiary butyl peroxide | 4.4 |
| Benzoyl peroxide | 4.4 |
| Xylol | 200 |
| Isopropyl alcohol | 130 |

*Procedure of preparation*

Charge into a reactor equipped with an agitator, a reflux condenser, a thermometer, and a nitrogen inlet tube 320 parts of xylol, 330 parts of 2-butoxy ethanol, 128 parts of fumaric acid and 8.8 parts of benzyl trimethyl ammonium chloride (60% solution in water). Heat to 270° F. and add 270 parts of styrene oxide. Hold for one hour at 270° F. and then start adding the ethyl acrylate-vinyl toluene and peroxide mixture to the reactor over a 2-hour period. Hold at 270-280° F. for an acid value of 14-16.

The final characteristics of the interpolymer are as follows:

| | |
|---|---|
| Solids (percent) | 49.4 |
| Viscosity (Gardner) | K-L |
| Acid value | 15.3 |
| Color (Gardner-Holdt) | 3-4 |

EXAMPLE 4

This example shows the invention as applied to propylene oxide.

Charge composition:

| | |
|---|---|
| 2-butoxy ethanol | 300 |
| Xylol | 290 |
| Fumaric acid | 116 |
| Benzyl trimethyl ammonium chloride (60% solution in water) | 8.0 |
| Propylene oxide | 116 |
| Vinyl toluene | 349 |
| Ethyl acrylate | 309 |
| Di-tertiary butyl peroxide | 4 |
| Benzoyl peroxide | 4 |
| Xylol | 250 |
| Isopropyl alcohol | 50 |

*Procedure of preparation*

Charge into an autoclave equipped with an agitator, a thermometer, and nitrogen inlet tube, 290 parts xylol, 300 parts of 2-butoxy ethanol, 116 parts of fumaric acid and 1 part of benzyl trimethyl ammonium chloride (60% solution in water). After displacing the air by nitrogen, heat to 230° F. and add 116 parts of propylene oxide over a 2-hour period, maintaining 20 pounds per square inch gauge nitrogen pressure. Hold for one hour at 270° F. and then start addition of ethyl acrylate-vinyl toluene-peroxide mixture to reactor over a 2-hour period at 260–270° F. Hold for an acid value of 16–18.

The final characteristics of interpolymer are as follows:

| | |
|---|---|
| Solids (percent) | 49.8 |
| Acid value | 17.8 |
| Viscosity (Gardner) | Y |
| Color (Gardner-Holdt) | 2-3 |

*Evaluation of hydroxyl interpolymers in coatings*

Due to the nature of the hydroxylated interpolymer resins, modifications are necessary to yield thermosetting enamels.

Thus, various combinations of hydroxylated interpolymer with epoxy resin and methylolated-butylated melamine resin have produced enamels with a wide range of physical properties and resistance characteristics.

As can be seen from the following formulations, higher levels of melamine resin result in enamels with greater hardness and chemical resistance, but are less flexible. Incorporation of a proportion of epoxy resin results in greater flexibility, and well balanced overall properties. The latitude of physical and chemical properties offered by the hydroxylated interpolymer systems provides the formulator many excellent opportunities to formulate numerous desirable coating solutions.

EXAMPLE 5

The hydroxy containing copolymers of the present invention may be mixed with other resinous materials such as butylated melamine resins and epoxy resins, to form compatible blends which cure upon heating to provide films possessing outstanding physical properties such as hardness, mar resistance, gloss, adhesion and flexibility. The blends are also chemically resistant to solvents, greases, soaps and detergents.

An enamel of the above type is prepared having the following composition.

| | Percent |
|---|---|
| Non-volatile resin | 32 |
| Titanium dioxide | 28 |
| Composition of non-volatile resin: | |
|     Interpolymer of Example 2 | 70 |
|     Butylated melamine-formaldehyde resin [1] | 15 |
|     Epoxy resin [2] | 15 |

[1] The epoxy resin is a substantially diglycidyl ether of 2,2'-bis(p-hydroxyphenylpropane) having a molecular weight of about 1000, an epoxide equivalent weight of about 500 (grams per epoxide equivalent weight), and a melting point of from 65–75° C.

[2] The butylated melamine-formaldehyde resin is a heat-hardenable solvent-soluble melamine-formaldehyde condensate etherified with butanol to provide solvent solubility and is employed in the form of a 55% by weight resin solids solution containing 25% butanol and 20% xylol. The melamine-formaldehyde resin is provided by heat reacting 5.5 mols of formaldehyde with 1 mol of melamine in the presence of excess butanol and a small amount of acid catalyst.

The enamel is prepared by grinding the titanium dioxide pigment into the organic solvent solution interpolymer of Example 2 to provide a 7½ N.S. gauge reading. A pebble mill is used for the grinding and xylol is added as needed in connection with the grind.

Three mil wet films are applied on chromate treated steel panels and baked for 20 minutes at 325° F. The following results are obtained:

| | |
|---|---|
| Pencil hardness | 3H. |
| Gloss reading (photovolt 60°) | 89. |
| Mar resistance | Very good. |
| Impact forward | Pass 30 inch/pounds. |
| Flexibility (mandrel bend) | Pass ⅛". |
| Recoat adhesion | Very good. |

Stain resistance, hardness, flexibility, detergent, salt and abrasion resistance are much superior to conventional alkyd-amine finishes.

The recoat adhesion is checked in an electric oven. The bake schedule is twenty minutes at 325° F. Panels are recoated one hour after initial bake. The enamel of the present example utilizing the hydroxylated interpolymer of Example 2 has excellent recoat adhesion.

Baker coatings produced in the present example are extremely hard and glossy, with outstanding physical properties such as hardness, toughness, gloss, adhesion, flexibility, and resistance to discoloration on aging.

EXAMPLE 6

An enamel particularly useful as a finish for refrigerators, washers, driers, and kitchen cabinets is prepared having the following composition.

| | Percent |
|---|---|
| Non-volatile resin | 32 |
| Titanium dioxide | 28 |
| Composition of non-volatile resin: | |
|     Interpolymer of Example 4 | 65 |
|     Epoxy resin (Note 1, Example 5) | 15 |
|     Butylated melamine-formaldehyde resin (Note 2, Example 5) | 20 |

*Procedure of preparation*

| | Pounds | Gallons |
|---|---|---|
| Titanium dioxide | 298 | 8.5 |
| Interpolymer of Example 4 | 150 | 18.6 |
| Xylol | 50 | 7.0 |
| Grind to 7½ N.S. gauge reading in pebble mill, then add— | | |
|     Interpolymer of Example 4 | 229 | 28.6 |
|     Epoxy Resin of Note 1 (50% solution in 2-ethoxy ethanol) | 130 | 14.4 |
|     Butylated melamine-formaldehyde resin of Note 2 | 155 | 18.5 |
|     Xylol | 53 | 7.5 |
| | 1,065 | 102.9 |

Three mil thick wet films are applied on chromate treated steel panels and baked for 20 minutes at 325° F. The following results are obtained:

| | |
|---|---|
| Pencil hardness | 3H–4H. |
| Gloss reading (photovolt 60°) | 90. |
| Mar resistance | Very good. |
| Impact forward | Pass 30 inch/pounds. |
| Flexibility (mandrel bend) | Pass ⅛". |
| Toluol resistance | Excellent. |

EXAMPLE 7

The present example illustrates the present invention as applied to the production of interpolymers which are thermosetting per se and in the absence of extraneous reactive resins such as amino or epoxy resins. The interpolymer of the present example contains 6% by weight of acrylamide, and 13% by weight of dihydroxy fumarate.

*Procedure of preparation*

| | |
|---|---|
| Xylol | 480 |
| Butanol | 285 |
| Fumaric acid | 80 |
| Propylene oxide | 80 |
| Benzyl trimethyl ammonium chloride (60% solution in water) | 8 |
| Paraformaldehyde | 55 |

Charge into an autoclave equipped with an agitator, a thermometer and nitrogen inlet tube. After displacing the air with nitrogen, heat to 240–250° F. maintaining 40 lbs. per sq. in. gauge nitrogen pressure.

Add monomer-catalyst mixture over 50–60 minutes at 250–270° F. and hold pressure at 25–30 lbs.

| | |
|---|---|
| Styrene | 552 |
| Ethyl acrylate | 412 |
| Acrylamide | 73 |
| Butanol | 224 |
| Xylol | 56 |
| Triethylamine | 2 |
| Di-tertiary butyl peroxide | 5.6 |
| Cumene-hydroperoxide | 4.8 |
| Azobisisobutyronitrile | 4 |
| Benzoyl peroxide | 4.8 |
| Tertiary dodecyl mercaptan | 7 |
| Cumene-hydroperoxide | 9 |

Add 3 parts after 1, 2, 3 hours. When addition is complete, hold for monomer conversion and acid value. The total reaction time is 7½ hours.

The final characteristics of the interpolymer are:

| | |
|---|---|
| Solids (percent) | 51.7 |
| Viscosity (Gardner) | X |
| Color (Gardner) | 1–2 |
| Acid value | 15.1 |

An appliance enamel was prepared by grinding in a pebble mill to provide a 7½ N.S. gauge reading. The enamel has the following composition:

| | Percent |
|---|---|
| Non-volatile resin of Example 7 | 32 |
| Titanium dioxide | 28 |

Three mil thick wet films are drawn on chromate treated steel panels and baked for 15 minutes at 350° F. The following are obtained:

| | |
|---|---|
| Pencil hardness | 3H. |
| 60° gloss (photovolt) | 90. |
| Mar resistance | Excellent. |
| Impact forward | Pass 30 inch/pounds. |
| Flexibility | Pass ⅛". |
| Xylol resistance | Excellent. |

As the above results indicate, this hydroxy polymer possesses excellent self-curing properties.

The invention is defined in the claims which follow.

I claim:
1. A method of producing non-gelled, solvent-soluble hydroxy-containing copolymers comprising providing an organic solvent containing at least one vinyl unsaturated monomer in solution therein and having dispersed therein discrete particles of monoethylenically unsaturated dicarboxylic acid which is poorly soluble in said solvent and present in an amount of from 2–50% by weight, based on the total weight of polymerizable monomers, subjecting said monomer and said dicarboxylic acid in said organic solvent to conditions of elevated temperature and esterification catalysts favoring an esterification reaction between said acid and monoepoxide in the presence of a free-radical generating polymerization catalyst and an organic monoepoxide containing a single oxirane group as the sole functional group thereof, said organic monoepoxide being present in an amount sufficient to convert at least 30% of the available carboxyl groups in said acid to hydroxy ester groups.

2. A method as recited in claim 1 in which said reaction is conducted in the presence of an esterification catalyst and at a temperature of at least 200° F.

3. A method as recited in claim 1 in which said monoethylenically unsaturated dicarboxylic acid is selected from the group consisting of fumaric acid and itaconic acid.

4. A method as recited in claim 1 in which said monoepoxide is selected from the group consisting of ethylene oxide, propylene oxide, butene-2-oxide, phenyl glycidyl ether, isopropyl glycidyl ether and styrene oxide.

5. A method as recited in claim 1 in which an esterification catalyst is used in an amount of at least 0.5% by weight, based on the weight of said dicarboxylic acid, and is selected from the group consisting of tertiary amines, quaternary ammonium salts and alkali metal salts.

6. A method as recited in claim 1 in which 5–30% by weight of said copolymer is fumaric acid.

7. A method as recited in claim 1 in which from 20–45% of said copolymer is selected from the group consisting of acrylate and methacrylate esters containing at least two carbon atoms and the balance of said copolymer consists essentially of vinyl monomer selected from the group consisting of monovinyl aromatic compound and methyl methacrylate.

8. A method as recited in claim 1 in which said monoepoxide is present in an amount sufficient to convert at least 90% of the available carboxyl groups in said acid to hydroxy ester groups.

9. A method as recited in claim 1 in which said organic solvent comprises a mixture of aromatic hydrocarbon and alcohol solvents.

10. A method as recited in claim 1 in which said reaction is conducted in the presence of an esterification catalyst and at a temperature of about 250–280° F.

11. A method of producing non-gelled, solvent-soluble hydroxy-containing copolymers which are thermosetting per se comprising providing an organic solvent having dissolved therein a monoethylenically unsaturated amide in an amount of from 2–7% by weight, based on the total weight of polymerizable material and at least one other monoethylenically unsaturated monomer and having dispersed therein discrete particles of monoethylenically unsaturated dicarboxylic acid which is poorly soluble in said organic solvent, said dicarboxylic acid being present in an amount of from 2–50% based on the total weight of polymerizable material, said organic solvent further containing aldehyde, and reacting said monomers and said dicarboxylic acid in said organic solvent at a temperature in excess of 200° F. and in the presence of an alkaline catalyst and a free-radical generating polymerization catalyst and in the further presence of an organic monoepoxide containing a single oxirane group as the sole functional group thereof to esterify at least 30% of the carboxyl groups of said dicarboxylic acid.

12. A method as recited in claim 11 in which said amide is an acrylamide.

13. A method as recited in claim 11 in which said amide is reacted with formaldehyde.

References Cited
UNITED STATES PATENTS

| | | | |
|---|---|---|---|
| 2,530,983 | 11/1950 | Minter | 260—78.5 |
| 3,002,959 | 10/1961 | Hicks | 260—78.5 |
| 3,207,718 | 9/1965 | Zimmerman | 260—846 |
| 3,250,734 | 5/1966 | Sekmakas | 260—78.5 |

SAMUEL H. BLECH, *Primary Examiner.*

MURRAY TILLMAN, *Examiner.*

P. LIEBERMAN, *Assistant Examiner.*

UNITED STATES PATENT OFFICE
CERTIFICATE OF CORRECTION

Patent No. 3,352,827                      November 14, 1967

Kazys Sekmakas

It is hereby certified that error appears in the above numbered patent requiring correction and that the said Letters Patent should read as corrected below.

Column 1, line 53, after "saponify" insert -- the --; column 2, line 19, for "group" read -- groups --; line 24, after "30%" insert a comma; line 25, for "90" read -- 90% --; same line 25, for "carboxylic" read -- carboxyl --; line 31, for "methyl" read -- methylol --; same column 2, line 61, after "from" insert -- about --; column 7, line 43, for "Baker" read -- Baked --; column 8, line 27, after "Charge" insert -- the above --; line 32, after "Add" insert -- the following --; line 45, after "Cumene-hydroperoxide" insert -- (not part of monomer-catalyst mixture) --; line 47, after "3 parts" insert -- cumene-hydroperoxide --; line 64, after "following" insert -- results --; column 9, line 12, for "catalysts" read -- catalysis --.

Signed and sealed this 31st day of December 1968.

(SEAL)
Attest:

EDWARD M. FLETCHER, JR.                  EDWARD J. BRENNER
Attesting Officer                        Commissioner of Patents